United States Patent
Madapoosi Sampath et al.

(10) Patent No.: US 11,129,159 B2
(45) Date of Patent: Sep. 21, 2021

(54) PROGRAMMATIC ORCHESTRATION OF CLOUD-BASED SERVICES

(71) Applicant: ServiceNow, Inc., Santa Clara, CA (US)

(72) Inventors: Vijayan Madapoosi Sampath, San Ramon, CA (US); Ashok Madhavan, Pleasanton, CA (US); Jayant Kaushal, Bangalore (IN); Shantanu Kumar Singh, Bangalore (IN); Utpal Vandravan Thakrar, Goleta, CA (US)

(73) Assignee: ServiceNow, Inc., Santa Clara, CA (US)

( * ) Notice: Subject to any disclaimer, the term of this patent is extended or adjusted under 35 U.S.C. 154(b) by 154 days.

(21) Appl. No.: 16/381,711

(22) Filed: Apr. 11, 2019

(65) Prior Publication Data
US 2020/0329464 A1    Oct. 15, 2020

(51) Int. Cl.
| | | |
|---|---|---|
| *H04W 72/04* | (2009.01) | |
| *H04L 29/08* | (2006.01) | |
| *H04W 72/06* | (2009.01) | |

(52) U.S. Cl.
CPC .......... *H04W 72/044* (2013.01); *H04L 67/10* (2013.01); *H04W 72/0493* (2013.01); *H04W 72/06* (2013.01)

(58) Field of Classification Search
CPC . G06F 9/5005; G06F 9/5072; H04L 41/0803; H04L 41/0843; H04L 41/0853;
(Continued)

(56) References Cited

U.S. PATENT DOCUMENTS

| | | |
|---|---|---|
| 5,978,594 A | 11/1999 | Bonnell |
| 6,321,229 B1 | 11/2001 | Goldman |

(Continued)

FOREIGN PATENT DOCUMENTS

EP    3399417 A1    11/2018

OTHER PUBLICATIONS

International Search Report and Written Opinion for PCT Application No. PCT/US2020/027245 dated Sep. 10, 2020; 14 pgs.

(Continued)

*Primary Examiner* — Awet Haile
(74) *Attorney, Agent, or Firm* — Fletcher Yoder PC

(57) ABSTRACT

A computational instance of a remote network management platform may be dedicated to a managed network that has access to computing resources of one or more remote networks. One or more server devices may be disposed within the computational instance and may cause a cloud service catalog software application to: (i) obtain a selection of a catalog item, where the catalog item defines prospective computing resources that provide a computing function, and where the selection includes a set of variables that associate the prospective computing resources with the one or more remote networks and determine configuration details for the prospective computing resources, (ii) populate a template representation with the variables, (iii) transmit the template representation to a server configured to identify target computing resources of the one or more remote networks and provision the target computing resources, and (iv) receive identification information related to the target computing resources.

18 Claims, 11 Drawing Sheets

(58) Field of Classification Search
CPC ..... H04L 41/12; H04L 41/5054; H04L 67/10; H04L 47/00; H04L 43/00; H04L 41/00; H04W 72/044; H04W 72/0493; H04W 72/06
See application file for complete search history.

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,292,300 B2 | 11/2007 | Kubo et al. |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinksy |
| 7,769,718 B2 | 8/2010 | Murley |
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,151,261 B2 | 4/2012 | Sirota |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,187,323 B2 | 1/2019 | Laplanche et al. |
| 2015/0058459 A1* | 2/2015 | Amendjian ......... G06F 9/45558 709/223 |
| 2015/0229628 A1* | 8/2015 | Kosim-Satyaputra ...................... H04L 67/34 726/4 |
| 2016/0019636 A1* | 1/2016 | Adapalli ................. H04L 47/70 705/26.62 |
| 2016/0337193 A1 | 11/2016 | Rao |
| 2017/0005865 A1 | 1/2017 | Liu et al. |
| 2018/0069804 A1* | 3/2018 | Laplanche ............ H04L 47/803 |
| 2020/0252475 A1* | 8/2020 | Marndi ............... G06F 9/45558 |

OTHER PUBLICATIONS

Introduction to AWS With Terfaform, https://hackernoon.com/introduction-to-aws-with-terraform-7a8daf261dc0 (downloaded from public Internet site Apr. 10, 2019), posted Apr. 10, 2018, 20 pages.
"ServiceNow London IT Operations Management", ServiceNow Docs, Mar. 12, 2019, 10 pages.
An Introduction to Terraform, https://blog.gruntwork.io/an-introduction-to-terraform-f17df9c6d180 (downloaded from public Internet site Apr. 10, 2019), posted Sep. 29, 2016, 30 pages.
Video entitled "Introduction to HashiCorp Terraform with Armon Dadgar"; posted at URL: https://www.youtube.com/watch?v=h97OZBgKINg&t=223s (screenshots and description included); video uploaded on May 29, 2018, 2 pages.

* cited by examiner

OBTAIN, BY A CLOUD SERVICE CATALOG SOFTWARE APPLICATION WITH ACCESS TO A PARTICULAR CATALOG ITEM THAT DEFINES PROSPECTIVE COMPUTING RESOURCES THAT PROVIDE A COMPUTING FUNCTION, A SELECTION OF THE PARTICULAR CATALOG ITEM, WHEREIN THE CLOUD SERVICE CATALOG SOFTWARE APPLICATION IS EXECUTABLE ON ONE OR MORE SERVER DEVICES DISPOSED WITHIN A COMPUTATIONAL INSTANCE OF A REMOTE NETWORK MANAGEMENT PLATFORM, WHEREIN THE COMPUTATIONAL INSTANCE IS DEDICATED TO A MANAGED NETWORK, WHEREIN THE MANAGED NETWORK HAS ACCESS TO COMPUTING RESOURCES OF ONE OR MORE REMOTE NETWORKS, AND WHEREIN THE SELECTION INCLUDES A SET OF CATALOG ITEM VARIABLES THAT: (I) ASSOCIATE THE PROSPECTIVE COMPUTING RESOURCES WITH THE ONE OR MORE REMOTE NETWORKS, AND (II) DETERMINE CONFIGURATION DETAILS FOR THE PROSPECTIVE COMPUTING RESOURCES ← 900

POPULATE, BY THE CLOUD SERVICE CATALOG SOFTWARE APPLICATION, A TEMPLATE REPRESENTATION, WHEREIN THE TEMPLATE REPRESENTATATION INCLUDES ENTRIES FOR THE SET OF CATALOG ITEM VARIABLES ← 902

TRANSMIT, BY THE CLOUD SERVICE CATALOG SOFTWARE APPLICATION TO AN INFRASTRUCTURE AS CODE (IAC) SERVER, THE TEMPLATE REPRESENTATION, WHEREIN THE IAC SERVER IS CONFIGURED TO: (I) IDENTIFY, BASED ON THE ENTRIES IN THE TEMPLATE REPRESENTATION, TARGET COMPUTING RESOURCES OF THE ONE OR MORE REMOTE NETWORKS THAT CAN PERFORM THE COMPUTING FUNCTION, AND (II) PROVISION THE TARGET COMPUTING RESOURCES ONTO THE ONE OR MORE REMOTE NETWORKS ← 904

RECEIVE, FROM THE IAC SERVER, IDENTIFICATION INFORMATION RELATED TO THE SECOND TARGET COMPUTING RESOURCES ← 906

FIG. 9

PROGRAMMATIC ORCHESTRATION OF CLOUD-BASED SERVICES

BACKGROUND

Cloud computing providers can make computing resources (e.g., databases, virtual machines, software applications, and/or other resources) remotely available to consumers statically or on demand. Typically, these computing resources are part of cloud-based networks operated by the cloud computing providers. Interaction between users and cloud-based networks may occur by way of the Internet.

An example of a user entity can be an enterprise. The enterprise may make use of a cloud-based network to support operations such as file sharing, web services, workflow management, database planning, and so on. By using the capabilities of cloud-based networks, the enterprise may create a "cloud computing infrastructure", or more particularly, a computing infrastructure that wholly or partially utilizes the computing resources of the cloud-based networks. Further, individual users from the enterprise may want have the ability to orchestrate computing resources on the cloud-based networks. However, this might be challenging for users having limited experience with cloud computing paradigms.

SUMMARY

Conventional techniques for orchestrating computing resources on cloud-based networks (e.g., managing, provisioning, removing, starting, these resources) may entail significant human interaction. For example, a typical scenario for provisioning a database might involve an application developer deploying a virtual machine on a cloud-based network, installing an operating system and database software on the virtual machine, and then manually starting the database software. This and other, similar, conventional approaches may be inconsistently performed, time-consuming, and prone to error, as techniques may differ depending on the application developer. As described to herein, such approaches for orchestrating computing resources may be referred to as "manual" approaches.

To overcome challenges with manual approaches, infrastructure as code (IaC) may be used. IaC is a paradigm that provides a programmatic way to define computing resources as entries in a mutable template file. By using this mutable file, common file maintenance practices may be applied to ensure consistency. That is, the template file may be kept under a version control system to allow reproducibility and testing practices among application developers. Moreover, during operations, software provided by an IaC platform may be used to identify, based on the entries of the template file, computing resources that should be provisioned onto the cloud-based networks and automatically provision the identified computing resources, allowing users to orchestrate computing resources offered by different cloud providers without necessarily having to manually interact with each cloud provider.

Although IaC may allow users to easily orchestrate computing resources through the use of a single template file, some deficiencies can still exist. Specifically, using IaC may still involve a substantial knowledge of cloud computing and IaC paradigms, which may limit the usage of IaC to highly knowledgably application developers. This may be detrimental to the speed and efficiency of managed network 300, as non-technical users with no experience with cloud computing, such as project managers, may want to utilize features of cloud-based networks.

Disclosed herein is an approach for integrating a computational instance of remote network management platform with customizable software to allow both technical and non-technical users from a managed network to orchestrate computing resources of cloud-based networks. In accordance with the disclosed approach, the computational instance may receive, from a client device associated with the managed network, a template representation containing entries associated with computing resources provided by one or more cloud-based networks. Using a cloud service catalog software application, the template representation can be analyzed to determine configurable parameters associated with the computing resources. Then, the cloud service catalog may separate out the configurable parameters to convert the computing resources into customized blueprints for prospective computing resources, while transforming the configurable parameters into questions associated with the prospective computing resources. Together, the blueprint for computational assets and questions may be listed as a catalog item on the cloud service catalog software application.

Upon receiving (i) a selection of a catalog item, and (i) answers to questions about prospective computing resources associated with the catalog item, the cloud service catalog software application may use the answers to associate the prospective computing resources of the selected catalog item with the one or more cloud-based networks. Moreover, the cloud service catalog software application may also determine configuration details for the prospective computing resources. Subsequently, the cloud service catalog software application may use the configuration details to populate entries of a template representation. This template representation may then be transmitted to an IaC server.

Based on the entries of the template reprsentation, the IaC server may: (i) identify target computing resources that should be provisioned onto the one or more cloud-based networks, and (ii) provision the target computing resources onto the one or more cloud-based networks. Information from these provisioned computing resources may be transmitted to the computational instance, which can perform discovery to store representations of the provisioned computing resources in a database within the computational instance.

Advantageously, using catalog items to provision computing resources may be beneficial to the managed network, as the capabilities of cloud-based networks can be offered to users without the users necessarily having to learn about the cloud computing paradigms respectively supported by the each of the cloud-based networks. Moreover, the questions presented by the cloud service catalog software application may be configured with validity checks and dropdown options that control the types of computing resources that may be provisioned, thus limiting or preventing input errors and/or ensuring adherence to certain rules. Using the techniques and approaches herein, support for easily provisioning computing resources offered by cloud-based networks can be added to a remote network management platform, allowing an enterprise to quickly adopt the operations provided by the computing resources.

Accordingly, a first example embodiment may involve a cloud service catalog software application with access to a particular catalog item, where the particular catalog item defines prospective computing resources that provide a computing function. The embodiment may also involve a computational instance of a remote network management platform, where the computational instance is dedicated to a managed network. The managed network may have access to computing resources of one or more remote networks. The computational instance may include one or more server devices configured to cause the cloud service catalog software application to obtain a selection of the particular catalog item, where the selection includes a set of catalog item variables that: (i) associate the prospective computing resources with the one or more remote networks, and (ii) determine configuration details for the prospective computing resources. The one or more server devices may further be configured to cause the cloud service catalog software application to populate a template representation, where the template representation includes entries for the set of catalog item variables. The one or more server devices may further be configured to cause the cloud service catalog software application to transmit the template representation to an IaC server. The IaC server may be configured to: (i) identify, based on the entries in the template representation, target computing resources of the one or more remote networks that can perform the computing function, and (ii) provision the target computing resources onto the one or more remote networks. The one or more server devices may further be configured to cause the cloud service catalog software application to receive, from the IaC server, identification information related to the target computing resources.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 is a flow chart, in accordance with example embodiments.

DETAILED DESCRIPTION

Figure 1:
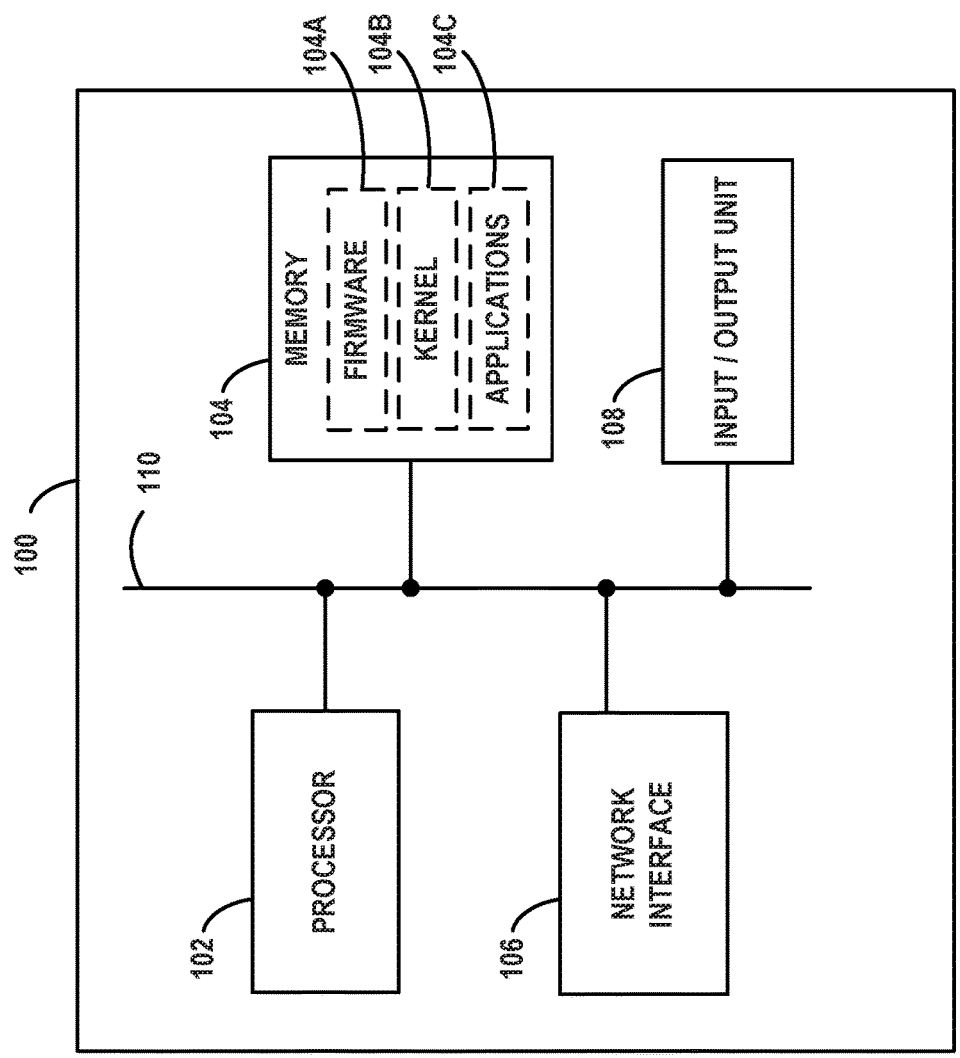
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
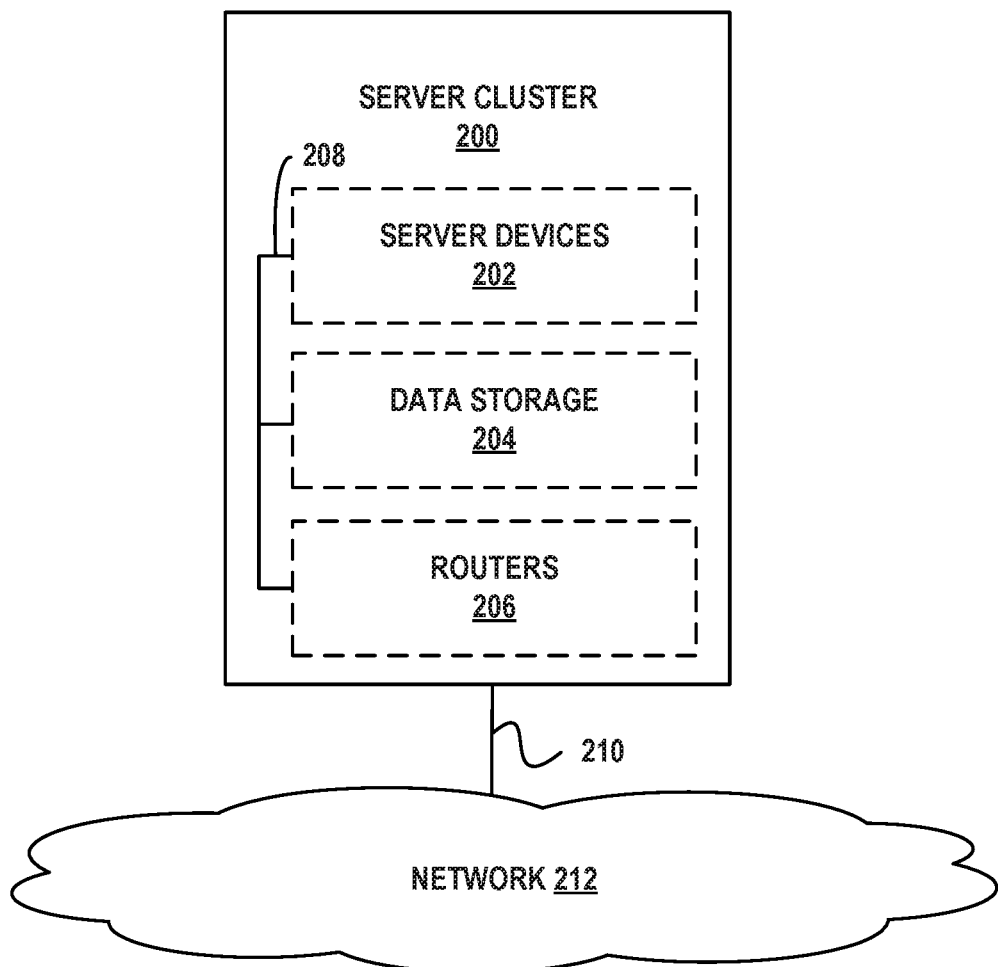
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
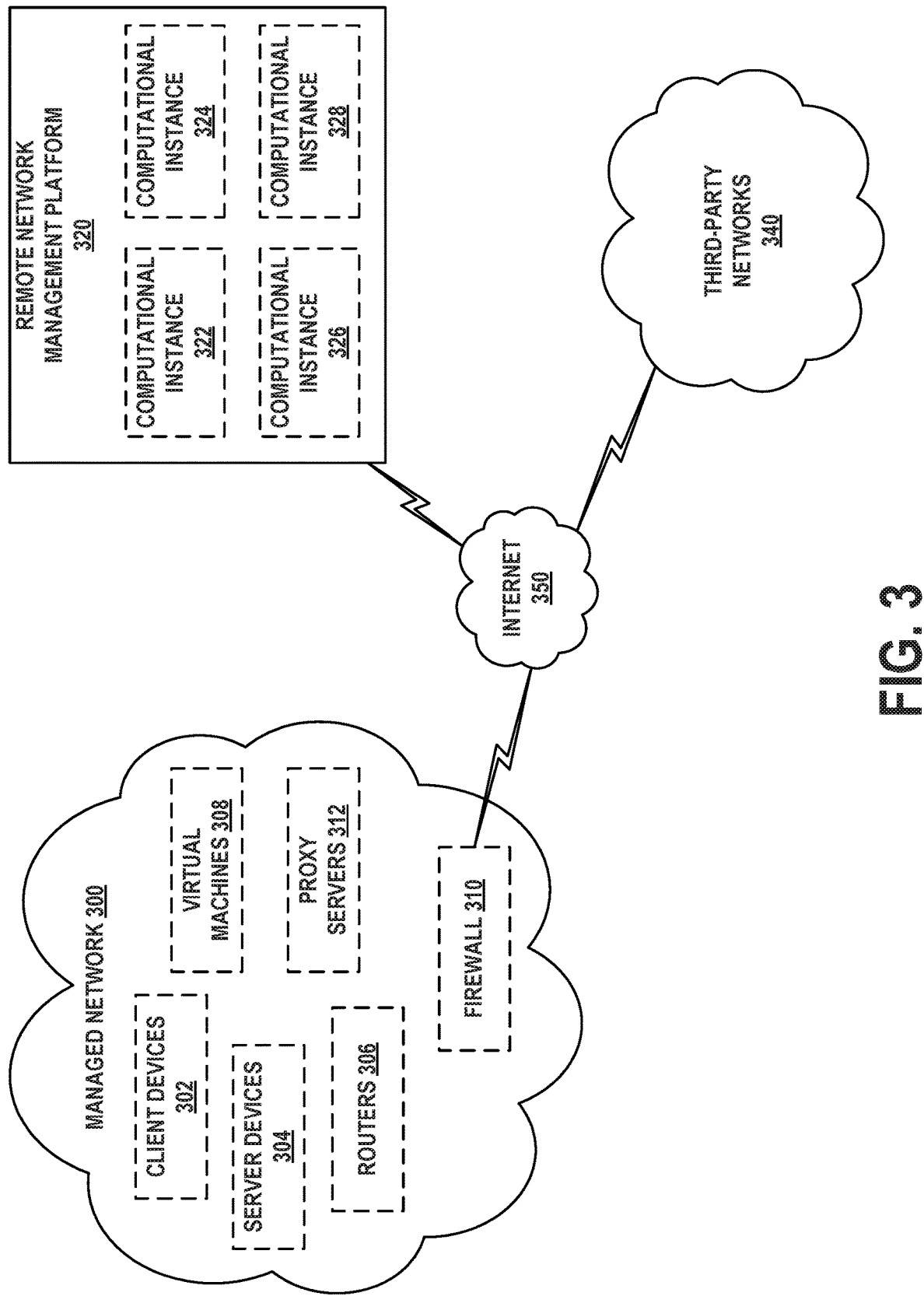
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
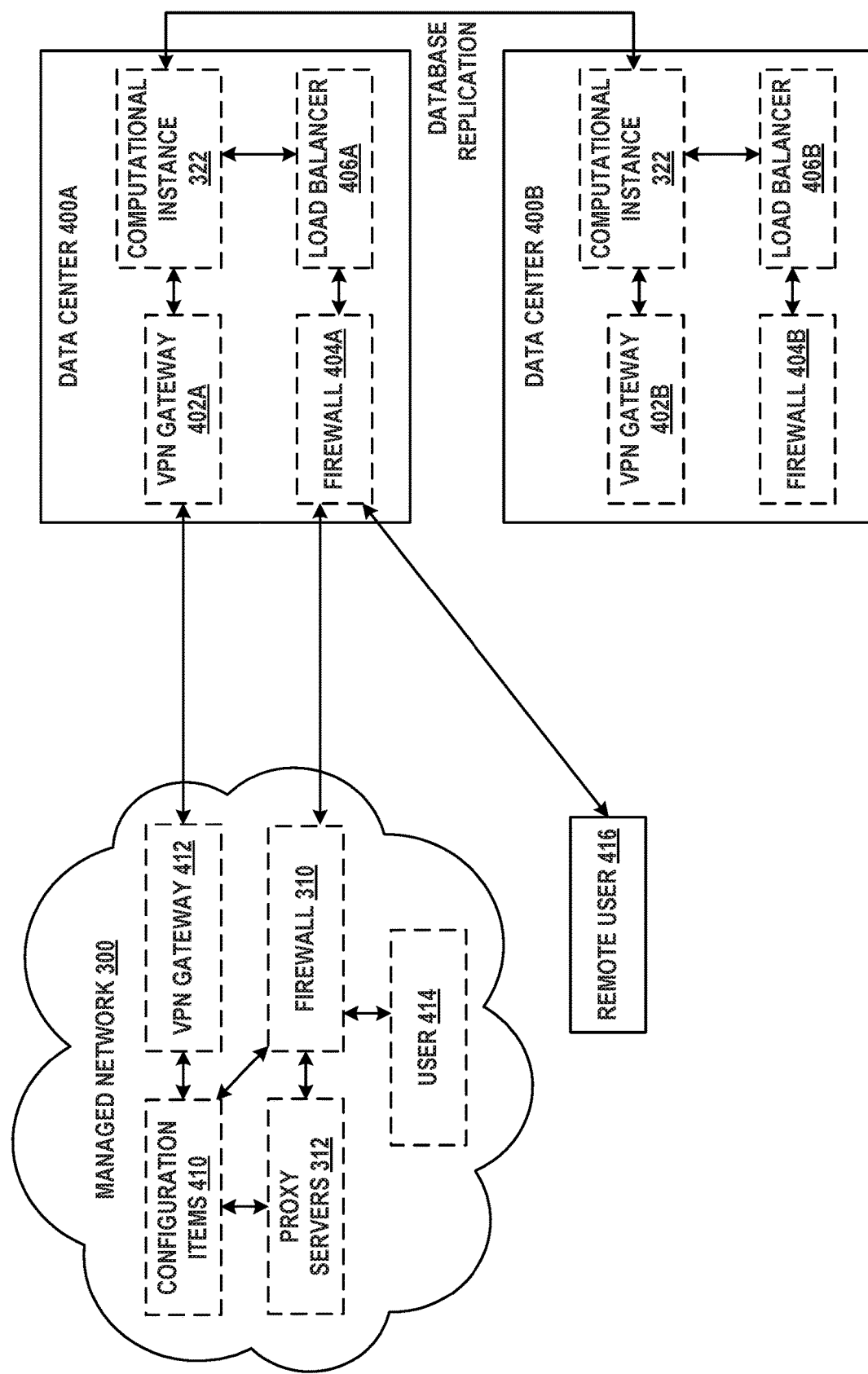
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
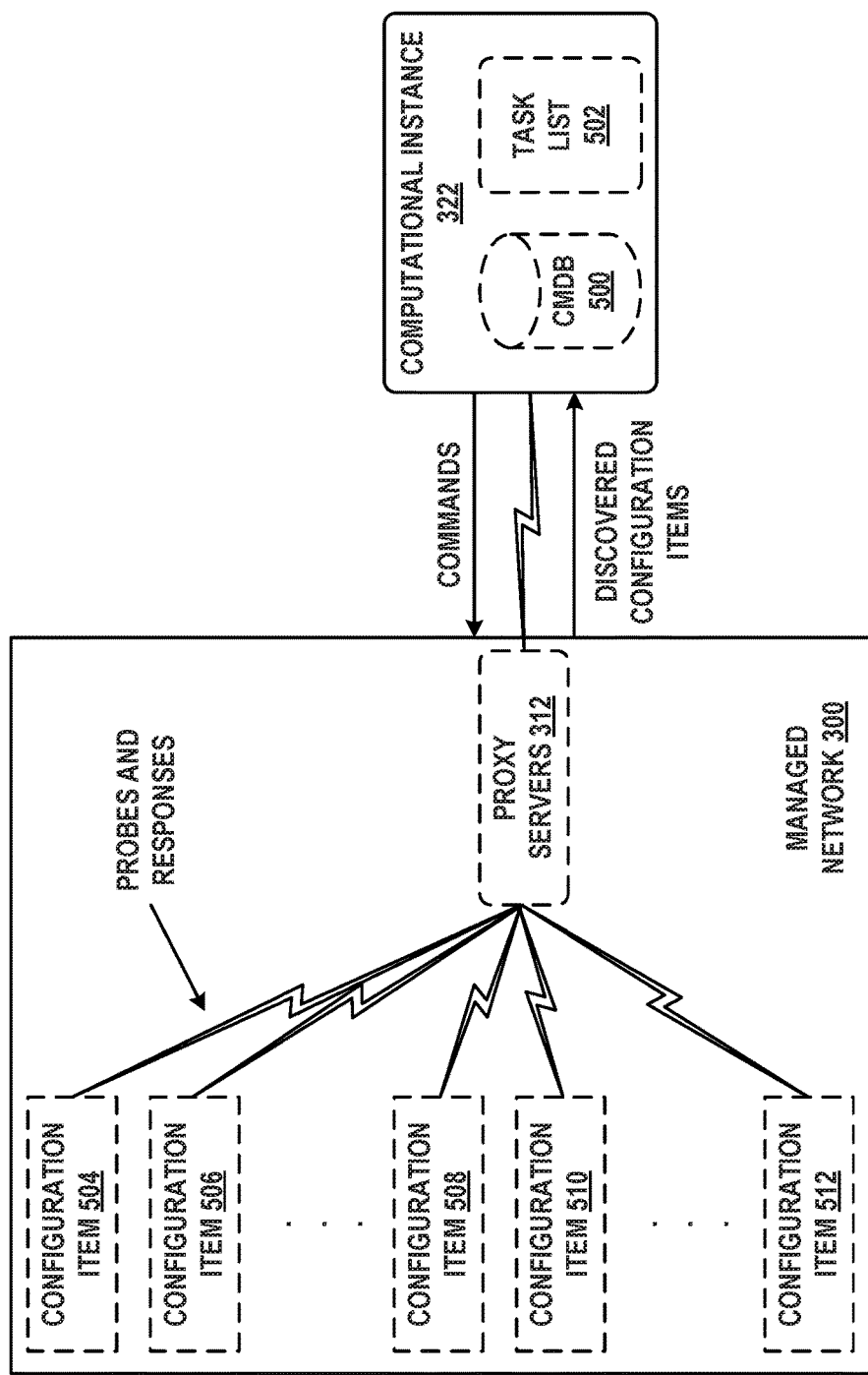
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
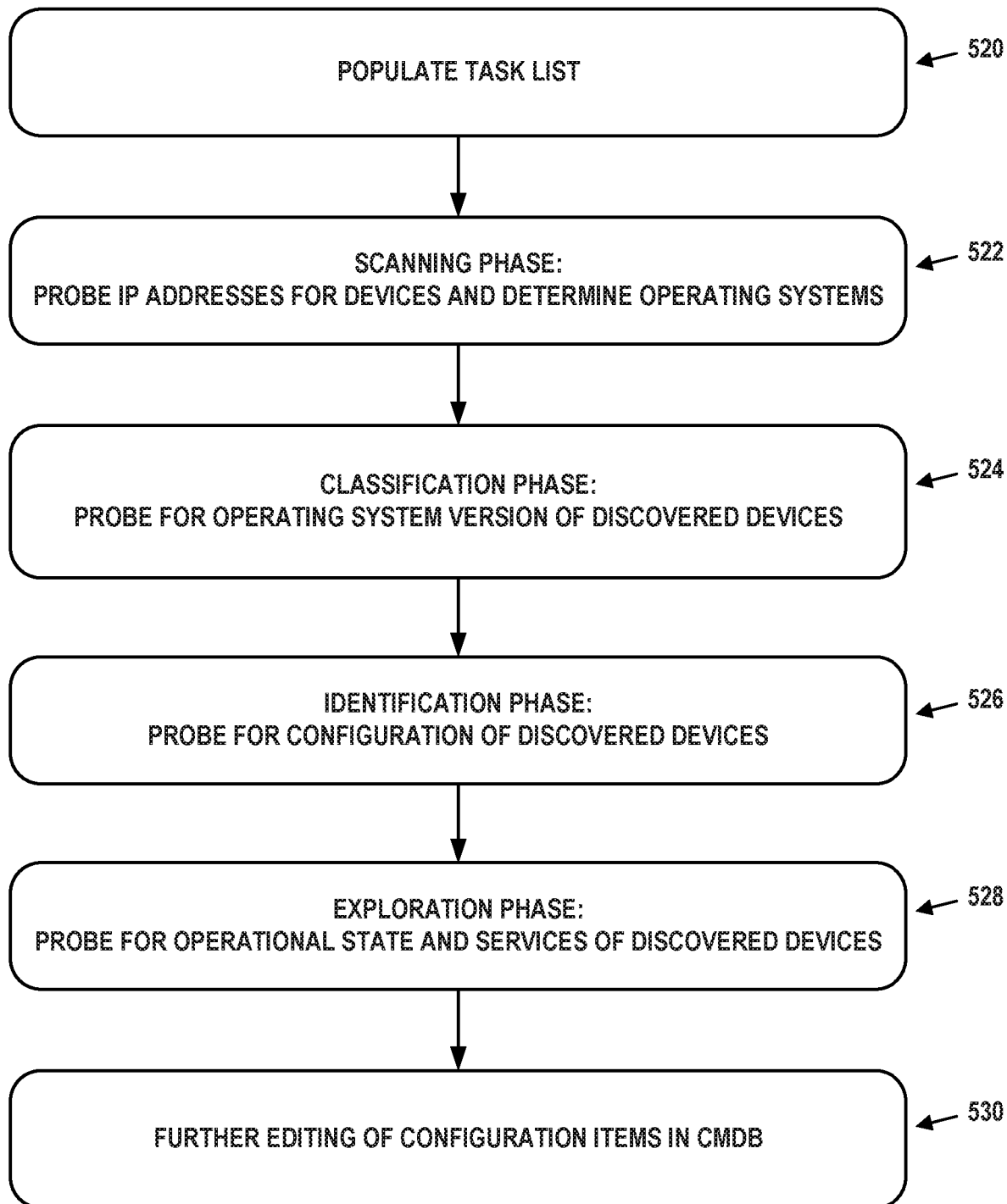
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Infrastructure as Code

As previously noted, "third-party networks" may be remote server devices that can be used for outsourced computational, data storage, communication, and service hosting operations. Examples of third-party networks may include AMAZON WEB SERVICES® and MICROSOFT® AZURE®. Managed network 300 may use one or more third-party networks to deploy applications and services to its users, clients, and customers. For instance, if managed network 300 provides online music streaming services, a third-party network may be configured to store the music files and provide web interface and streaming capabilities. In this way, the enterprise of managed network 300 does not have to build and maintain its own servers for these operations. By using the capabilities of third-party networks, managed network 300 may create a "cloud computing infrastructure", or more particularly, a computing infrastructure that wholly or partially utilizes the remote server devices of third-party networks. In example embodiments, third-party networks may also be referred to as "cloud-based networks."

In many circumstances, managed network 300 may be responsible for configuring and arranging (e.g., otherwise referred to as orchestrating) components of a cloud computing infrastructure. As an example, deploying an application may entail an application developer of managed network 300 provisioning a virtual machine (VM) on a cloud-based network and configuring the VM with an operating system that can support the needs of the application. Once the VM is configured, the application developer may access the VM (e.g., via a secure shell protocol) and manually start the application. Only then may the application be ready for use. As described to herein, the above approach for deploying applications may be referred to as a "manual" deployment approach.

A significant challenge in the manual deployment approach is that, because managed network 300 may have multiple application developers working on each application, deployments may be inconsistent. For example, VM configurations may differ depending on the application developer deploying the application. Moreover, extraneous VM instances may be provisioned for each application if the application developers do not communicate with each other. This may result in unwanted variance in configurations, extraneous infrastructure nodes, and other issues.

One solution for addressing these challenges is using infrastructure as code (IaC). IaC is a paradigm that provides a programmatic way of defining and orchestrating a cloud computing infrastructure through the use of a single source code file (which may be referred to herein as a "template file"). By treating the cloud computing infrastructure as a mutable file, common file maintenance practices may be applied to ensure greater infrastructure consistency. That is, the single source code file may be kept under a version control system to allow auditability, reproducible builds, and testing practices among application developers and system administrators. In practice, remote network management platform 320 may provide managed network 300 with IaC capabilities through an IaC platform. An example of an IaC platform is TERRAFORM®.

Notably, while the embodiments herein use "template files" to illustrate IaC concepts, in practice, IaC platforms may use several mechanisms to orchestrate computing resources of one or more cloud-based networks. For example, rather than using a file to represent a desired state of one or more cloud-based networks, an IaC platform may be configured to interpret command line interface (CLI) or application programming interface (API) commands to update an internal state of the IaC platform. For this reason, in some embodiments, an IaC template file may be referred to as a "template representation."

Figure 6:
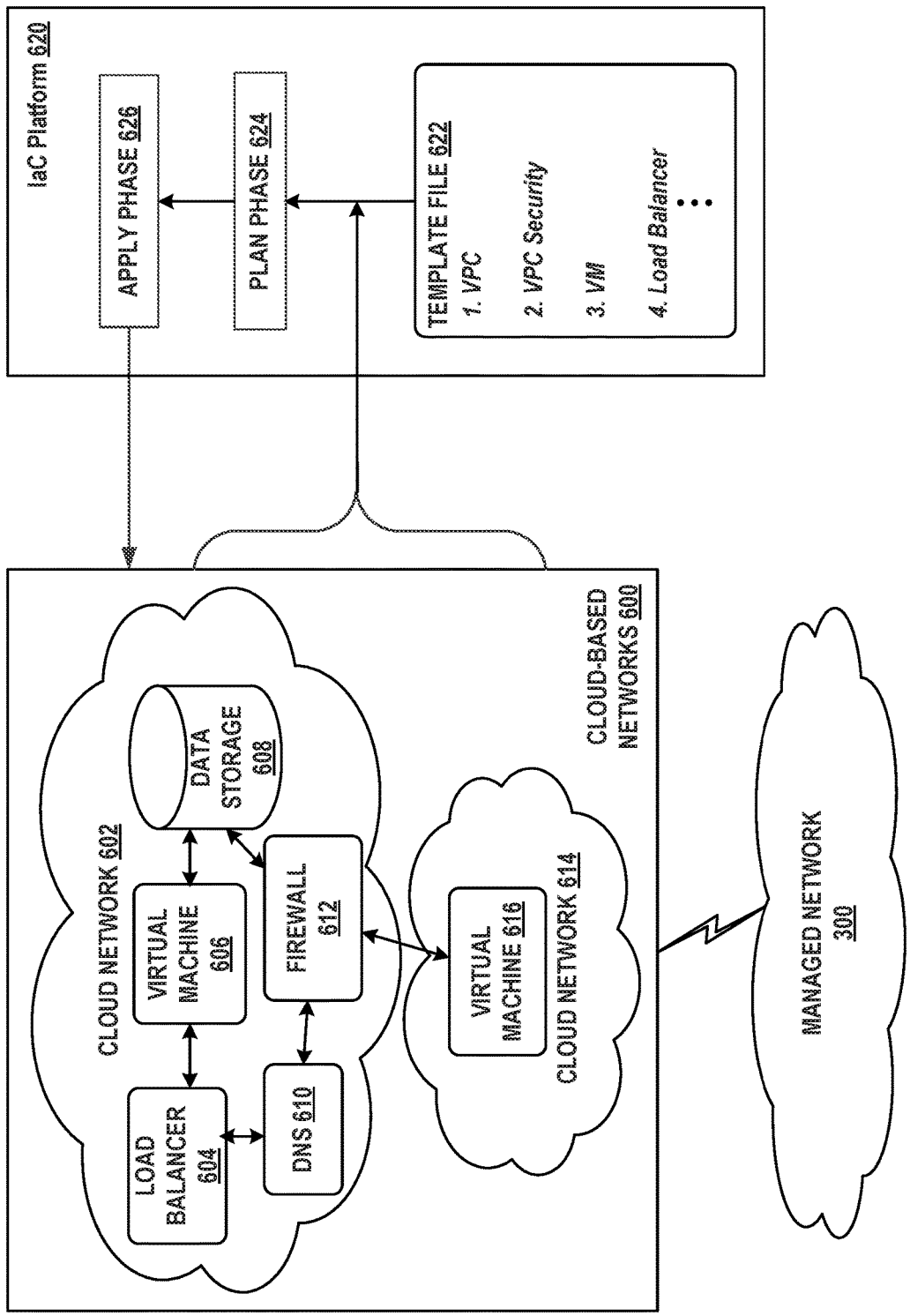
FIG. 6 illustrates an infrastructure as code approach of managing cloud computing infrastructures, in accordance with example embodiments.

FIG. 6 illustrates features, components, and/or operations for an IaC approach of managing cloud computing infrastructures, in accordance with example embodiments. Although FIG. 6 illustrates a specific arrangement, operations disclosed herein may be carried out in the context of similar and/or other arrangement(s) as well without departing from the scope of the present disclosure.

FIG. 6 includes cloud-based networks 600, which may be used by managed network 300 to deploy applications and services to its clients and customers. Cloud-based networks 600 may take on some or all of the properties discussed for third-party networks 340. Cloud-based networks 600 may contain communicatively coupled computing resources (e.g., servers, software applications, databases, and/or other resources) hosted by a mix of cloud computing providers. For example, load balancer 604, virtual machine 606, data storage 608, domain name server 610, and firewall 612 may be computing resources that are allocated within a cloud network 602 provided by AMAZON WEB SERVICES®, while virtual machine 616 may be a computing resource allocated within a cloud network 614 provided MICROSOFT® AZURE®. Despite differences in cloud computing providers/networks, computing resources of different cloud-based networks may engage in communication to exchange data and/or perform computational operations. For example, by using a VPN connection, virtual machine 616 may engage in communication with the components of cloud network 602. Thus, in practice, cloud-based networks 600 may include computing resources from several cloud computing providers. This may be beneficial, as different cloud computing providers may offer different services to managed network 300.

In accordance with the present disclosure, IaC platform 620 may enable managed network 300 to orchestrate computing resources of cloud-based networks 600. By facilitating interactions with multiple cloud providers, IaC platform

620 can act as a single source for orchestrating cloud computing infrastructure. In some cases, IaC platform 620 may be implemented as a separate computational device that can be accessed by managed network 300, for example, through a CLI, API, or web interface. In other cases, IaC platform may be implemented on a computational device within managed network 300.

IaC platform 620 may utilize entries of template file 622 to orchestrate the computing resources of cloud-based networks 600. Entries in template file 622 may be written in a structured data format (e.g., JavaScript Object Notation (JSON) or HASHICORP® configuration language (HCL)) that can be interpreted by IaC platform 620 to represent a desired state of cloud-based networks 600. Each entry may provide specific details about a computing resource. These details may take the form of one or more key-value pairs (herein referred to as configurable parameters). In particular, configurable parameters may differ between cloud providers. As an example, a common configurable parameter for a virtual machine resource can be the physical location for which the virtual machine is requested. As such, entries describing virtual machines provided by AMAZON WEB SERVICES® may label this configurable parameter as "region", whereas entries describing virtual machines provided by MICROSOFT® AZURE® may label configurable parameter as "area". Other differences in configurable parameters between cloud providers may exist.

An initial step to using template file 622 may be to configure one or more cloud providers for which computing resources are requested. For example, template file 622 may contain an entry with the following format:

```
provider "aws"{
    access_key = "my_key"
}
```

In this entry, the "provider" parameter may indicate a specific cloud provider (in this case AMAZON WEB SERVICES®) for which computing resources are requested. The "access key" parameter may indicate credentials needed to access a specific account of managed network 300 on the cloud provider.

Continuing from the above example, for each cloud provider, many different types of computing resources may be requested (e.g., servers, databases, load balancers, etc.). As such, template file 622 may contain an entry with the following format:

```
resource "aws_instance" "example" {
    ami = "ami-2d39803a"
    region="us-east-1",
    instance_type="t2.micro"
    count = "5"
}
```

This entry specifies a computing resource (in this case, an "aws_instance" provided by AMAZON WEB SERVICES®) and a name for the computing resource (in this case "example"). In the above example, the computing resource includes several configurable parameters. The "ami" parameter may refer to virtual machine image that contains operating systems/virtual application software to operate the computing resource. The example above sets this parameter to a specific virtual machine image provided by AMAZON WEB SERVICES®. Given that cloud providers have data centers spread across the world, the "region" parameter may indicate a particular location for which computing resources for the cloud provider should be operating. The "instance type" parameter may specify the hardware for the resource, including the amount of CPU, memory, disk space, and networking specifications. The example above sets this parameter to specific hardware configuration provided by AMAZON WEB SERVICES®. And the "count" parameter may specify the number of instances of the resource that should be operating (in this case 5).

Notably, the entries above are just illustrations of entries and configurable parameters that may be included in template file 622. For example, template file 622 may include configurable parameters that describe dependencies between computing resources, disk space, IP addresses, ports, and/or other features. Moreover, even though the above examples were discussed in connection with AMAZON WEB SERVICES®, the examples are solely a convenient conceptual representation and are not intended to be limiting with respect to example embodiments or techniques described herein. For example, other cloud providers such as MICROSOFT® AZURE® or IBM CLOUD® may contain similar entries and configurable parameters in template file 622. As such, template file 622 may integrate multiple computing resources across multiple cloud providers in a single file.

Generally, users from managed network 300 may add/remove entries and/or modify configuration parameters of template file 622 to signify desired changes cloud-based networks 600. For example, if a user from managed network 300 wishes to change the cloud provider of a virtual machine, the user may modify the configuration parameters related to the cloud provider (e.g., change "aws_instance" to "ibm_instance" and so on). Advantageously, a user can use template file 622 to modify cloud providers and/or configuration parameters of computing resources within having to physically interact with each of the cloud providers.

Upon detecting a change to template file 622, IaC platform 620 may automatically synchronize cloud-based networks 600 and template file 622 through plan phase 624 and apply phase 626.

During plan phase 624, computing resources of cloud-based networks 600 (i.e., resources that are actually in operation") may be reconciled with the template file 622 (i.e., resources that should be in operation"). In other words, based on the entries listed (or not listed) in template file 622, plan phase 624 may identify computing resources that should be added (or removed) from cloud-based networks 600. For example, DNS 610 and data storage 608 may be listed as entries in template file 622, but may not exist as computing resources in cloud-based networks 600. In this scenario, plan phase 624 may then identify DNS 610 and data storage 608 as computing resources that should be provisioned in cloud-based networks 600. As another example, load balancer 604 may be a computing resource operating on cloud-based networks 600, but may not have a corresponding entry in template file 622. In this scenario, plan phase 624 may identify load balancer 604 as a resource that should be removed from cloud-based networks 600. As used herein, the identification of computing resources that should be added (or removed) from cloud-based networks 600 may be referred to as a "plan".

During apply phase 626, the plan generated from plan phase 624 may be applied to cloud-based networks 600. That is, computing resources listed in the plan may be provisioned (or removed) onto cloud-based networks 600. Thus, apply phase may involve IaC platform 620 engaging in communication cloud providers to provision (or remove) computing resources. In some cases, provisioning of resources may be ordered so as to capture dependencies that exist between computing resources of cloud-based networks 600. For example, DNS 610 may rely on load balancer 604 for operation. Thus, load balancer 604 should be provisioned before provisioning DNS 610. When one or more resources may be provisioned in parallel, IaC platform 620 may be configured to provision items in parallel to save time.

Notably, the phases above are used for the purpose of example. In practice, IaC platform 620 may use more or fewer phases to synchronize cloud-based networks 600 and template file 622.

However, even with the benefits described above, IaC may still have drawbacks. As an initial matter, deploying applications using IaC platform 620 may still involve substantial knowledge of cloud computing and IaC paradigms, limiting the usage of IaC to application developers and system administrations of managed network 300. This may be detrimental to the speed and efficiency of managed network 300, as non-technical users, such as project managers with no experience with cloud computing, may want to deploy infrastructure instances. Additionally, interaction with IaC platform 620 may be limited to actions on a CLI, which may be complex and confusing to all but the experienced user.

To address these and other issues, the entity operating remote network management platform 320 may provide a customizable software application to allow both technical and non-technical users from managed network 300 to orchestrate computing resources offered by cloud-based networks. As will be discussed in more detail below, the improved approaches described herein may dynamically identify customizable parameters of an IaC template file and provide users with options to populate these parameters, rather than having to rely on the assistance of an application developer or system administrator. Once populated, the approaches described herein provide a method to consume the IaC template and provision the appropriate infrastructure components. Advantageously, the embodiments described herein present a technical improvement for utilizing IaC by providing a customizable interface and method for orchestrating computing resources without the need to consult with application developers or system administrators.

VI. Programmatic Integration with Cloud Services

Disclosed herein is an approach for integrating a computational instance of a remote network management platform with a customizable software application to allow both technical and non-technical users from a managed network to orchestrate computing resources on a cloud computing infrastructure. The disclosed approach could provide an advantage and improvement over current IaC practices. For example, the customizable software application may allow for validity checks and dropdown options that control the types of computing resources that may be provisioned, thus limiting or preventing input errors and/or ensuring adherence to certain rules. Moreover, through the use of intuitive questions provided to the user, the customizable software application could offer the capabilities of multiple cloud providers without users necessarily having to learn about the cloud computing paradigms respectively supported by the each of the different cloud providers. Other advantages and improvements are possible.

Figure 7A:
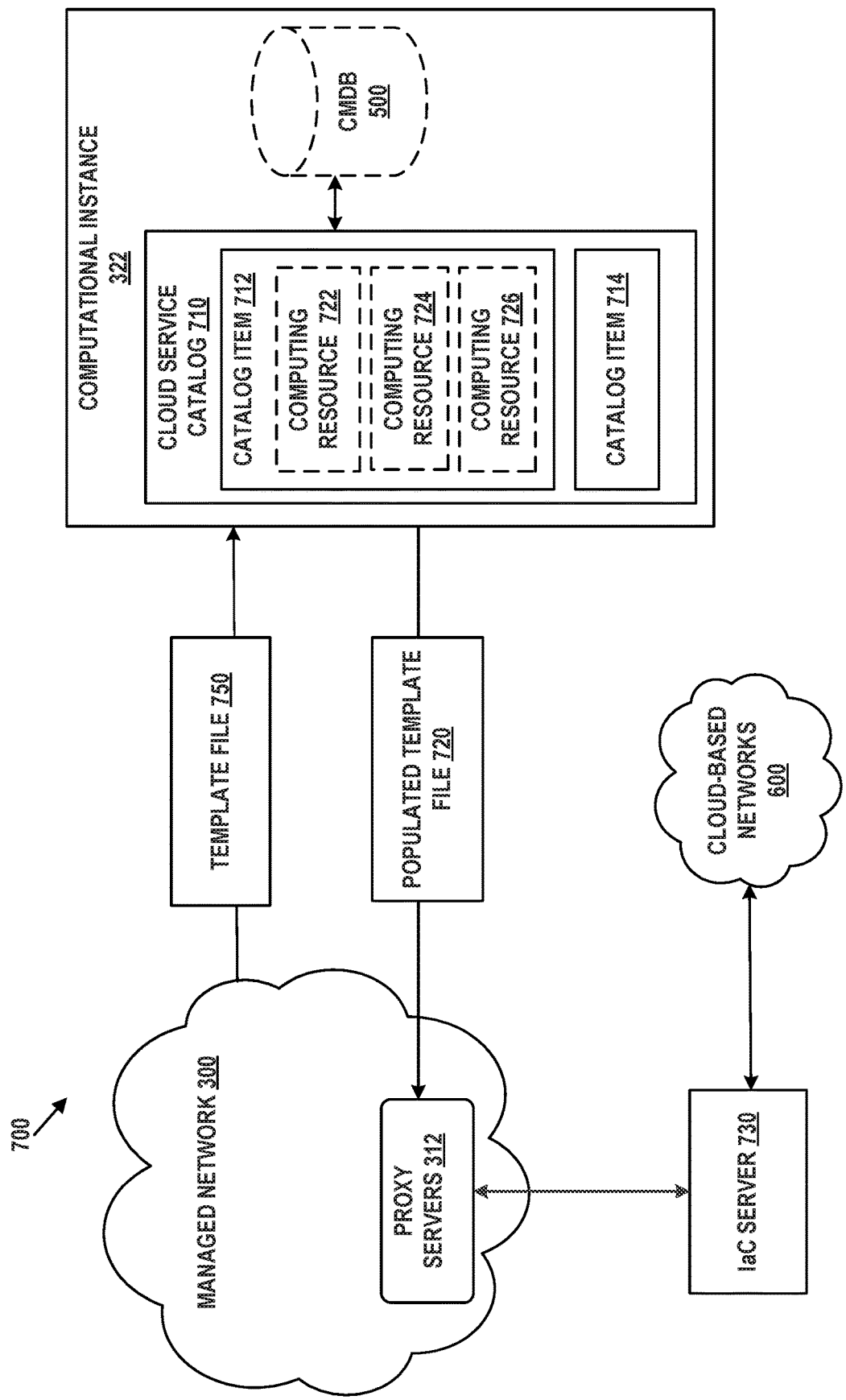
FIG. 7A illustrates a computing system, in accordance with example embodiments.

FIG. 7A illustrates features, components, and/or operations of computing system 700. Computing system 700 includes four main components, managed network 300, computational instance 322, infrastructure as code (IaC) server 730, and cloud-based networks 600, all communicatively connected, for example, by way of a network. Although FIG. 7A illustrates a specific arrangement, operations disclosed herein may be carried out in the context of similar and/or other arrangement(s) as well without departing from the scope of the present disclosure.

In particular, computing system 700 may include server device(s) (not shown). The server device(s) may contain or may otherwise have access to program instructions executable by processor(s), so as to cause the computing system 700 to carry out various operations described herein. On this point, the server device(s) may include server device(s) disposed within computational instance 322. Additionally or alternatively, the server device(s) may include server device(s) disposed within the managed network 300 and/or within IaC server 730.

Managed network 300 may be an enterprise network used by an entity for computing and communications tasks, as well as storage of data. In examples, managed network 300 may be a subscriber to computing resources on cloud-based networks 600. These resources may include computational, data storage, communication, and/or other services. Managed network 300 may include one or more proxy servers 312. Possibly with the assistance of proxy servers 312, computational instance 322 may be able to orchestrate computing resources of cloud-based networks 600 that are used by managed network 300.

Computational instance 322 may be disposed within remote network management platform 320 and dedicated to managed network 300. Computational instance 322 may store, in CMDB 500, discovered configuration items that represent the environment of managed network 300. Furthermore, computational instance 322 may include cloud service catalog 710 to allow users from managed network 300 to orchestrate computing resources provided by cloud-based networks 600.

Cloud service catalog 710 may be a customizable software application presented as a web page or series of web pages hosted by computational instance 322 and provided to a user from managed network 300 upon request. In particular, cloud service catalog 710 may include one or more "catalog items" that are presented to the user as actionable entities. As used herein, a catalog item may be a blueprint for prospective computing resources that, as a unit, provide a specific computing function. For example, a catalog item 712 may be associated with a web application. As such, the blueprint for catalog item 712 may include an operating system, a web server, and a database. As another example, catalog item 714 may be associated with an infrastructure monitoring tool. Thus, the blueprint catalog item 714 may include a monitoring service, a storage volume, and a visualization application. As catalog items are merely blueprints for prospective computing resources, details of the prospective computing resources (otherwise known as catalog item variables) may be provided by the user in order to provision the catalog item onto cloud-based networks 600. In more particular terms, a user may provide catalog item variables to associate the prospective computing resources with a group of virtual or physical computing resources on cloud-based networks 600 that can actually execute the specific computing function of the catalog item (which may be referred to herein as "target computing resources").

Through the web page or series of web pages, users from managed network 300 may select one or more catalog items from cloud service catalog 710 to provision onto cloud-based networks 600. Such selection may involve answering a series of questions about the selected catalog item. By answering these questions, a user can effectively choose the catalog item variables that form the target computing resources of the catalog item. For example, the user may be asked to specify a cloud provider on which to deploy the catalog item, a geographic region on which the catalog item should be operating, and so on. As shown in FIG. 7A, computing resources 722, 724, and 726 can illustrate physical computing resources that can result from user's answers to these questions. For example, computing resource 722 may be a UBUNTU® LINUX® operating system (with the catalog item variables being LINUX® and UBUNTU®). Further, computing resource 724 may an APACHE® web server provided by MICROSOFT® AZURE® (with the catalog item variables being APACHE® and MICROSOFT® AZURE®). And computing resource 726 may be a MySQL database with 2TB of storage (with the catalog item variables being MySQL and 2TB). As such, these combined acts of (i) choosing a catalog item and (ii) answering questions related to the catalog item may be referred to as designing a "stack".

Upon receiving a design for a stack, cloud service catalog 710 may: (i) determine, based on the answers to questions, the catalog item variables, (ii) populate entries in an IaC template file to match the catalog item variables, and (iii) transmit the IaC template file to IaC server 730. As shown in FIG. 7A, populated template file 720 may represent such an IaC template file that may be created from a designed stack.

IaC server 730 may be a computing device on computing system 700 that includes the software of an IaC platform. In one example, IaC server 730 may be a separate computational entity from managed network 300. In this situation, the credentials to access IaC server 730 may be held by proxy servers 312. In another example, IaC server 730 may be a computational entity that is part of managed network 300. In either case, IaC server 730 can be configured with credentials to access cloud-based networks 600.

After receiving populated template file 720, IaC server 730 may use populated template file 720 to execute a plan phase and an apply phase. As described in connection with FIG. 6, a plan phase may identify, based on the entries in the populated template file, the target computing resources that should be added to (or removed from) cloud-based networks 600,while the apply phase operation may actually provision the target computing resources onto cloud-based networks 600. Upon executing these phases, IaC server 730 may notify proxy server 312 about the computing resources that were added to cloud-based networks 600. Such information may be obtained, for example, from each of the cloud providers of cloud-based networks 600 for which computing resources were provisioned. Proxy server 312 may transmit this information to computational instance 322 to allow for discovery of the newly added computing resources. In line with the discussion above, discovered computing resources may then be stored in CMDB 500.

To add new catalog items to cloud service catalog 710, a user from managed network 300 may transmit template file 750 to computational instance 322. In example embodiments, template file 750 may contain entries corresponding to computing resources on cloud-based networks 600. Template file 750 may be transmitted by way of a graphical interface provided to managed network 300 by computational instance 322. This interface could be arranged to allow users from managed network 300 to upload and/or copy the contents of template file 750 onto computational instance 322. Upon receiving template file 750, computational instance 322 may provide the contents of the file to cloud service catalog 710 to convert the entries of template file 750 into a catalog item.

Figure 7B:
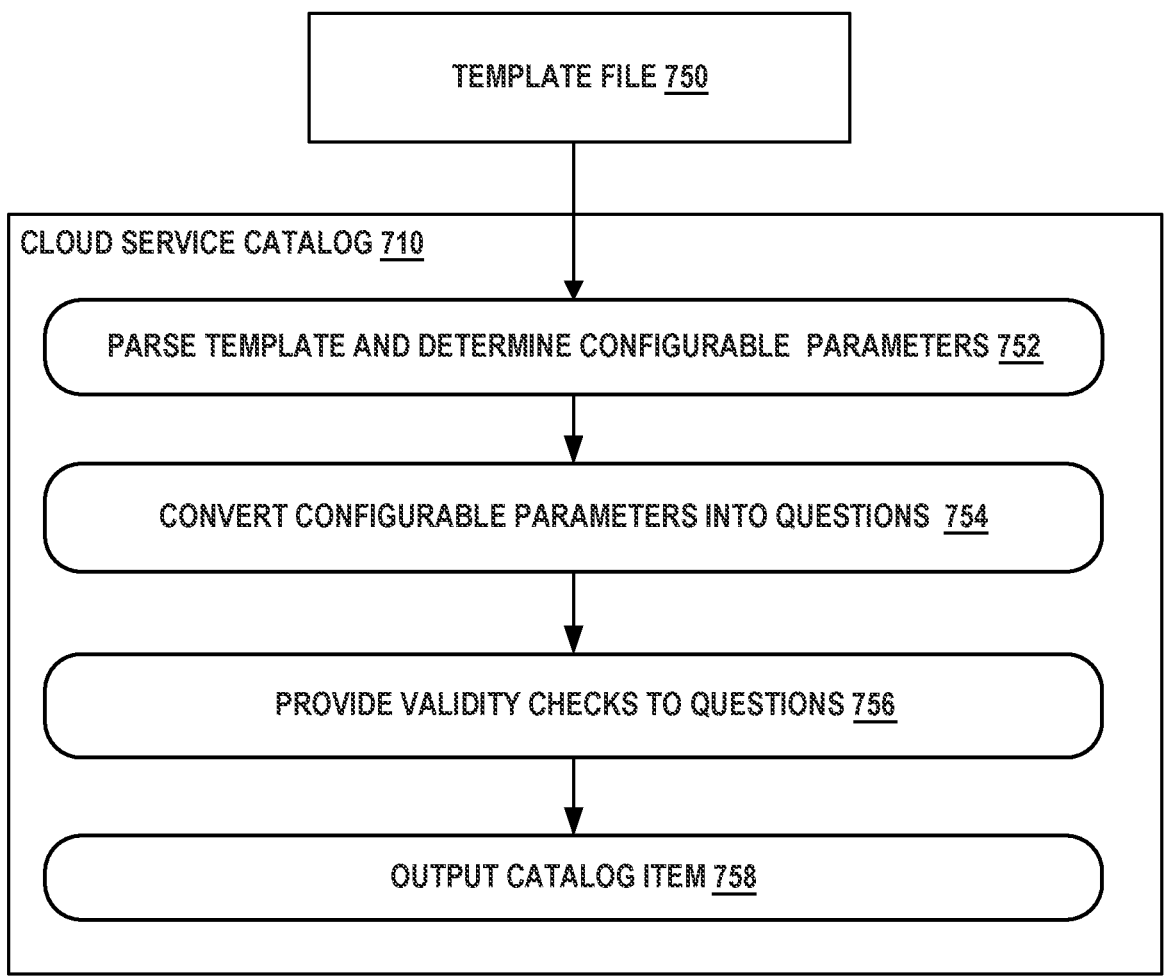
FIG. 7B is a flow chart for adding a new catalog item, in accordance with example embodiments.

This conversion process can be illustrated in FIG. 7B. At block 752, cloud service catalog 710 may utilize a customized parser to: (i) analyze the entries of template file 750, and (ii) determine configurable parameters within the entries. Because of the structured data format (e.g., JSON, HCL) of template file 750, the customized parser may be preconfigured with concatenations of the nested objects and/or arrays (herein referred to as paths) to locate certain configurable parameters within template file 750. Using such paths can be advantageous when parsing the template file 750, because not all configurable parameters may be of interest and paths can be used to define the configurable parameters that are of interest.

At block 754, the determined configurable parameters within the entries of template file 750 may be converted into catalog item questions. For example, a "count" parameter could be transformed into the question: "How many instances do you want?" As other example, a "provider" parameter could be transformed into the question "Which cloud service would you like to use?" As an even further example, an "instance type" parameter could be transformed into the question "What instance would you like to deploy?" Other questions are also possible.

As block 756, cloud service catalog 710 may configure validity checks for each question. For example, if a user answers the question "What cloud service would you like to use?" with a response "123", cloud service catalog 710 may be configured to display an error message indicating that the response is not a recognized cloud provider. As another example, rather than allowing users to enter to textual responses to questions, cloud service catalog 710 can configure answers as dropdown boxes. Using the previous example, given the question "What cloud service would you like to use?", a dropdown menu may provide the options of AMAZON WEB SERVICES®, MICROSOFT® AZURE® or IBM CLOUD®.

At block 758, the catalog item and the related questions may be added to cloud service catalog 710. Advantageously, the process of FIG. 7B allows template file 750 to be defined by technical users with knowledge of cloud computing paradigms, and then made available to non-technical users from managed network 300. Additionally, the conversion process of FIG. 7B may allow cloud service catalog 710 to disassociate entries of template file 750 from a specific cloud-based provider. For example, suppose template file 750 contains entries corresponding to computing resources provided by AMAZON WEB SERVICES®. By converting template file 750 into a catalog item and then allowing users to answer questions that decide the target computing resources of the catalog item, cloud service catalog 710 may, in effect, permit users to select a cloud-based provider other than AMAZON WEB SERVICES® to provide the target computing resources of the catalog item, for example, MICROSOFT® AZURE®.

Figure 8:
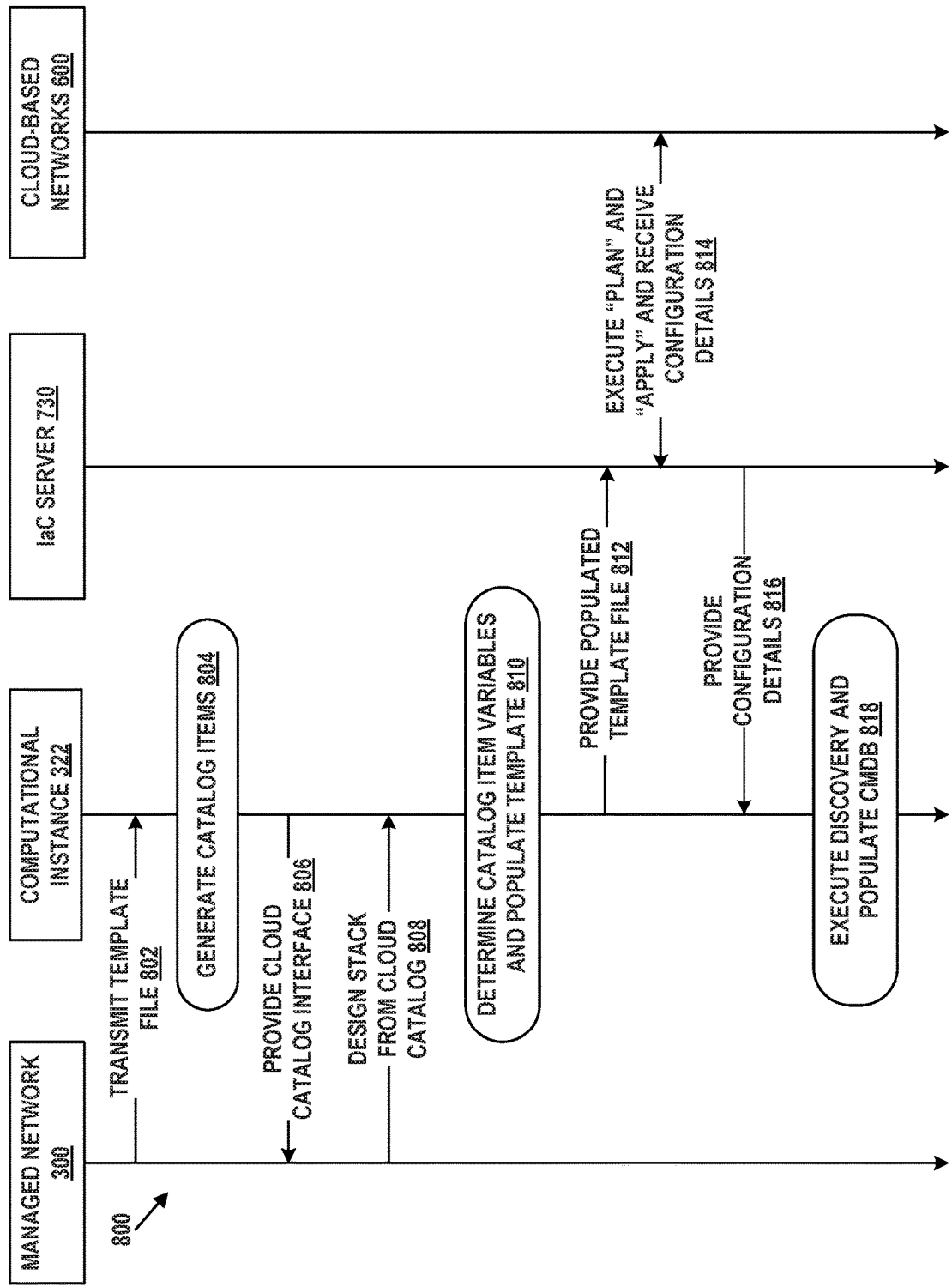
FIG. 8 illustrates a provisioning procedure, in accordance with example embodiments.

FIG. 8 illustrates a provisioning procedure 800 using the components of computing system 700, in accordance with example embodiments. At step 802, managed network 300 may transmit a template file, for example template file 750, to computational instance 322. As discussed, the template file may contain entries corresponding to target computing resources on cloud-based networks 600. The transmission may be facilitated, for example, via a graphical user interface provided by computational instance 322 to managed network 300.

At step 804, the computational instance 322 may parse the received template file to identify configurable parameters within the template file. This may be performed, for example, through the customizable parser of cloud service catalog 710. Once parsed, the computational instance 322 may generate one or more new catalog items and questions relating to the new catalog items. At step 806, computational instance 322 may provide an updated cloud service catalog interface to managed network 300, for example, through a web page or series of web pages. The updated cloud service catalog may contain the new catalog items corresponding to the parsed template file.

At step 808, a user from manage network 300 may design a stack by: (i) choosing a catalog item from the cloud service catalog, and (ii) answering questions related to the catalog item. This may be performed, for example, via a web browser and may involve the user choosing a cloud catalog item to provision.

At step 810, computational instance 322 may determine, based on the user's answers to questions, catalog item variables for the catalog item. Then, computational instance 322 may populate entries of an IaC template file to match the catalog item variables. At step 812, the populated IaC template file may be transmitted to IaC server 730.

At step 814, after receiving the IaC template file, IaC server 730 may execute a plan phase operation to identify target computing resources that should be added to cloud-based networks 600. As noted above, this operation may result in a "plan" created by IaC server 730. Then, IaC server 730 may execute an apply phase operation on the "plan" to provision the target computing resources onto cloud-based networks 600. During the apply phase, IaC server may receive configuration details relating to each of the newly provisioned computing resources. At step 816, IaC server 730 may provide these configuration details to computational instance 322. At step 818, the configuration details may be used by computational instance 322 to perform discovery on the newly provisioned computing resources.

VII. Example Operations

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 involves obtaining, by a cloud service catalog software application with access to a particular catalog item that defines prospective computing resources that provide a computing function, a selection of the particular catalog item. The cloud service catalog software application is executable on one or more server devices disposed within a computational instance of a remote network management platform. The computational instance is dedicated to a managed network that has access to computing resources of one or more remote networks. In particular, the selection includes a set of catalog item variables that: (i) associate the prospective computing resources with the one or more remote networks, and (ii) determine configuration details for the prospective computing resources.

Block 902 involves populating, by the cloud service catalog software application, a template representation. The template representation includes entries for the set of catalog item variables.

Block 904 involves transmitting, by the cloud service catalog software application to an IaC server, the template representation. The IaC server is configured to: (i) identify, based on the entries in the template representation, target computing resources of the one or more remote networks that can perform the computing function, and (ii) provision the target computing resources onto the one or more remote networks.

Block 906 involves receiving, from the IaC server, identification information related to the target computing resources.

Some embodiments involve obtaining, by the cloud service catalog software application, a second selection of a second particular catalog item. The cloud service catalog software application has access to the second particular catalog item that defines second prospective computing resources that provide a second computing function. In particular, the second selection includes second set of catalog item variables that: (i) associate the second prospective computing resource with the one or more remote networks, and (ii) determine configuration details for the second prospective computing resources. The embodiments may also involve populating, by the cloud service catalog software application, a second template representation, where the second template representation includes entries for the second set of catalog item variables. The embodiments may also involve transmitting, by the cloud service catalog software application to the IaC server, the second template representation, where the IaC server is configured to (i) identify, based on the entries in the second template representation, second target computing resources of the one or more remote networks that can perform the second computing function, and (ii) provision the second target computing resources onto the one or more remote networks. The embodiments may also involve receiving, from the IaC server, second identification information related to the second target computing resources.

Some embodiments involve receiving, from a client device, a template representation containing entries defining target computing resources to be provisioned on the one or more remote networks. The embodiments may also involve converting, by the cloud service catalog software application, the template representation into the particular catalog item, wherein the converting involves (i) creating the prospective computing resources based on the entries, (ii) identifying configurable parameters related to the entries, and (iii) creating the set of catalog item variables based on the configurable parameters.

In some embodiments, the entries defining target computing resources are complex data objects and identifying configurable parameters related to the entries includes specifying paths within the complex data objects in which the configurable parameters of the entries are located.

In some embodiments, the one or more remote networks are cloud-based networks that are physically distinct from the remote network management platform and the managed network, and the remote network management platform and the managed network both access the one or more remote networks by way of a wide-area network.

Some embodiments involve discovering, by the cloud service catalog software application and from the identification information related to the target computing resources, representations of configuration items associated with the target computing resources. The embodiments may also involve storing, in persistent storage disposed within the computational instance, the representations of configuration items, where the persistent storage contains, in tables, representations of discovered configuration items related to the managed network.

In some embodiments, obtaining the selection of the particular catalog item involves: (i) generating, by the cloud service catalog software application, one or more graphical user interfaces with data entry elements for selecting the particular catalog item and associated catalog item variables from a plurality of catalog items, (ii) providing, by the cloud service catalog software application and to a client device associated with the managed network, the one or more graphical user interfaces, and (iii) receiving, by the cloud service catalog software application, from the client device, and entered by way of the data entry elements, the selection of the particular catalog item.

In some embodiments, the data entry elements are configured with validity checks that, based at least on the prospective computing resources, determine the entries that are permitted for the data entry elements.

In some embodiments, provisioning the target computing resources onto the one or more remote networks involves the IaC server confirming that the target computing resources have yet to be provisioned onto the one or more remote networks.

In some embodiments, the IaC server is disposed within the managed network.

In some embodiments, a system may involve means for obtaining, by a cloud service catalog software application with access to a particular catalog item that defines prospective computing resources that provide a computing function, a selection of the particular catalog item. The cloud service catalog software application is executable on one or more server devices disposed within a computational instance of a remote network management platform. The computational instance is dedicated to a managed network that has access to computing resources of one or more remote networks. In particular, the selection includes a set of catalog item variables that: (i) associate the prospective computing resources with the one or more remote networks, and (ii) determine configuration details for the prospective computing resources. The system may also involve means for populating, by the cloud service catalog software application, a template representation. The template representation includes entries for the set of catalog item variables. The system may also involve means for transmitting, by the cloud service catalog software application to an infrastructure as code (IaC) server, the template representation. The IaC server is configured to: (i) identify, based on the entries in the template representation, target computing resources of the one or more remote networks that can perform the computing function, and (ii) provision the target computing resources onto the one or more remote networks. The system may also involve means for receiving, from the IaC server, identification information related to the target computing resources.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a computational instance of a remote network management platform, wherein the computational instance is dedicated to a managed network, and wherein the managed network has access to computing resources of one or more remote networks;
a cloud service catalog software application with access to a particular catalog item, wherein the particular catalog item defines prospective computing resources that provide a computing function, and wherein the particular catalog item comprises a plurality of catalog item variables, and each catalog item variable of the plurality of catalog item variables comprises a plurality of configurations, wherein the cloud service catalog software application has access to a second particular catalog item, wherein the second particular catalog item defines second prospective computing resources that provide a second computing function, wherein the second particular catalog item comprises a second plurality of catalog item variables, and each catalog item variable of the second plurality of catalog item variables comprises a second plurality of configurations; and
one or more server devices disposed within the computational instance and configured to cause the cloud service catalog software application to perform operations including:
obtaining a selection of the particular catalog item, wherein the selection includes, for one or more of the plurality of catalog item variables, a user-defined configuration of the plurality of configurations that: (i) associates the prospective computing resources with the one or more remote networks, and (ii) determines configuration details for the prospective computing resources;
populating a template representation, wherein the template representation includes entries for the plurality of catalog item variables,
transmitting the template representation to an infrastructure as code (IaC) server, wherein the IaC server is configured to: (i) identify, based on the entries in the template representation, target computing resources of the one or more remote networks that can perform the computing function, and (ii) provision the target computing resources onto the one or more remote networks,
receiving, from the IaC server, identification information related to the target computing resources,
obtaining a second selection of the second particular catalog item, wherein the second selection includes, for one or more of the second plurality of catalog item variables, a second user-defined configuration of the second plurality of configurations that: (i) associates the second prospective computing resources with the one or more remote networks, and (ii) determines configuration details for the second prospective computing resources,
populating a second template representation, wherein the second template representation includes entries for the second plurality of catalog item variables,
transmitting the second template representation to the IaC server, wherein the IaC server is configured to: (i) identify, based on the entries in the second template representation, second target computing resources of the one or more remote networks that can perform the second computing function, and (ii) provision the second target computing resources onto the one or more remote networks, and
receiving, from the IaC server, second identification information related to the second target computing resources.

2. The system of claim 1, wherein the one or more server devices are configured to cause the cloud service catalog software application to perform operations including:
receiving, from a client device, the template representation including the entries, wherein the entries define the target computing resources to be provisioned on the one or more remote networks;
converting the template representation into the particular catalog item, wherein the converting comprises: (i) creating the prospective computing resources based on the entries, (ii) identifying configurable parameters related to the entries, and (iii) creating the plurality of catalog item variables based on the configurable parameters.

3. The system of claim 2, wherein the entries defining the target computing resources are complex data objects, and wherein identifying the configurable parameters related to the entries includes specifying paths within the complex data objects in which the configurable parameters of the entries are located.

4. The system of claim 1, wherein the one or more remote networks are cloud-based networks that are physically distinct from the remote network management platform and the managed network, and wherein the remote network management platform and the managed network both access the one or more remote networks by way of a wide-area network.

5. The system of claim 1, comprising:
persistent storage disposed within the computational instance, the persistent storage containing, in tables, representations of discovered configuration items related to the managed network, wherein the one or more server devices are configured to cause the cloud service catalog software application to perform operations including:
discovering, using the identification information related to the target computing resources, representations of configuration items associated with the target computing resources; and
storing, in the persistent storage, the representations of configuration items.

6. The system of claim 1, wherein obtaining the selection of the particular catalog item comprises:
generating one or more graphical user interfaces with data entry elements for selecting the particular catalog item and, for the one or more of the plurality of catalog item variables, the user-defined configuration, from a plurality of catalog items;
providing, to a client device associated with the managed network, the one or more graphical user interfaces; and
receiving, from the client device and entered by way of the data entry elements, the selection of the particular catalog item and, for the one or more of the plurality of catalog item variables, the user-defined configuration.

7. The system of claim 6, wherein the data entry elements are configured with validity checks that, based at least on the prospective computing resources, determine the entries that are permitted for the data entry elements.

8. The system of claim 1, wherein provisioning the target computing resources onto the one or more remote networks comprises the IaC server confirming that the target computing resources have yet to be provisioned onto the one or more remote networks.

9. The system of claim 1, wherein the IaC server is disposed within the managed network.

10. A computer-implemented method comprising:
obtaining, by a cloud service catalog software application with access to a particular catalog item that defines prospective computing resources that provide a computing function, a selection of the particular catalog item, wherein the cloud service catalog software application is executable on one or more server devices disposed within a computational instance of a remote network management platform, wherein the computational instance is dedicated to a managed network, wherein the managed network has access to computing resources of one or more remote networks, wherein the particular catalog item comprises a plurality of catalog item variables, wherein each catalog item variable of the plurality of catalog item variables comprises a plurality of configurations, and wherein the selection includes, for one or more of the plurality of catalog item variables, a user-defined configuration of the plurality of configurations that: (i) associates the prospective computing resources with the one or more remote networks, and (ii) determines configuration details for the prospective computing resources;
populating, by the cloud service catalog software application, a template representation, wherein the template representation includes entries for the plurality of catalog item variables;
transmitting, by the cloud service catalog software application to an infrastructure as code (IaC) server, the template representation, wherein the IaC server is configured to:
(i) identify, based on the entries in the template representation, target computing resources of the one or more remote networks that can perform the computing function, and (ii) provision the target computing resources onto the one or more remote networks;
receiving, from the IaC server, identification information related to the target computing resources;
obtaining, by the cloud service catalog software application, a second selection of a second particular catalog item, wherein the cloud service catalog software application has access to the second particular catalog item, wherein the second particular catalog item defines second prospective computing resources that provide a second computing function, wherein the second particular catalog item comprises a second plurality of catalog item variables, wherein each catalog item variable of the second plurality of catalog item variables comprises a second plurality of configurations, wherein the second selection includes, for one or more of the second plurality of catalog item variables, a second user-defined configuration of the second plurality of configurations that: (i) associates the second prospective computing resources with the one or more remote networks, and (ii) determines configuration details for the second prospective computing resources;
populating, by the cloud service catalog software application, a second template representation, wherein the second template representation includes entries for the second plurality of catalog item variables;
transmitting, by the cloud service catalog software application to the IaC server, the second template representation, wherein the IaC server is configured to: (i) identify, based on the entries in the second template representation, second target computing resources of the one or more remote networks that can perform the second computing function, and (ii) provision the second target computing resources onto the one or more remote networks; and
receiving, from the IaC server, second identification information related to the second target computing resources.

11. The computer-implemented method of claim 10, comprising:
receiving, from a client device, the template representation including the entries, wherein the entries define the target computing resources to be provisioned on the one or more remote networks;
converting, by the cloud service catalog software application, the template representation into the particular catalog item, wherein the converting comprises: (i) creating the prospective computing resources based on the entries, (ii) identifying configurable parameters related to the entries, and (iii) creating the plurality of catalog item variables based on the configurable parameters.

12. The computer-implemented method of claim 11, wherein the entries defining the target computing resources are complex data objects, and wherein identifying the configurable parameters related to the entries includes specifying paths within the complex data objects in which the configurable parameters of the entries are located.

13. The computer-implemented method of claim 10, wherein the one or more remote networks are cloud-based networks that are physically distinct from the remote network management platform and the managed network, and wherein the remote network management platform and the managed network both access the one or more remote networks by way of a wide-area network.

14. The computer-implemented method of claim 10, comprising:
discovering, by the cloud service catalog software application and from the identification information related to the target computing resources, representations of configuration items associated with the target computing resources; and
storing, in a persistent storage disposed within the computational instance, the representations of configuration items, wherein the persistent storage contains, in tables, representations of discovered configuration items related to the managed network.

15. The computer-implemented method of claim 10, wherein obtaining the selection of the particular catalog item comprises:
generating, by the cloud service catalog software application, one or more graphical user interfaces with data entry elements for selecting the particular catalog item and, for the one or more of the plurality of catalog item variables, the user-defined configuration, from a plurality of catalog items;

providing, by the cloud service catalog software application and to a client device associated with the managed network, the one or more graphical user interfaces; and receiving, by the cloud service catalog software application from the client device and entered by way of the data entry elements, the selection of the particular catalog item and, for the one or more of the plurality of catalog item variables, the user-defined configuration.

16. The computer-implemented method of claim 15, wherein the data entry elements are configured with validity checks that, based at least on the prospective computing resources, determine the entries that are permitted for the data entry elements.

17. The computer-implemented method of claim 10, wherein provisioning the target computing resources onto the one or more remote networks comprises the IaC server confirming that the target computing resources have yet to be provisioned onto the one or more remote networks.

18. An article of manufacture including a non-transitory computer-readable medium, having stored thereon program instructions that, upon execution by one or more server devices disposed within a computational instance of a remote network management platform, cause the one or more server devices to perform operations comprising:

obtaining, by a cloud service catalog software application with access to a particular catalog item that defines prospective computing resources that provide a computing function, a selection of the particular catalog item, wherein the cloud service catalog software application is executable in the one or more server devices, wherein the computational instance is dedicated to a managed network, wherein the managed network has access to computing resources of one or more remote networks, wherein the particular catalog item comprises a plurality of catalog item variables, wherein each catalog item variable of the plurality of catalog item variables comprises a plurality of configurations, and wherein the selection includes, for one or more of the plurality of catalog item variables, a user-defined configuration of the plurality of configurations that: (i) associates the prospective computing resources with the one or more remote networks, and (ii) determines configuration details for the prospective computing resources;

populating, by the cloud service catalog software application, a template representation, wherein the template representation includes entries for the plurality of catalog item variables;

transmitting, by the cloud service catalog software application to an infrastructure as code (IaC) server, the template representation, wherein the IaC server is configured to:

(i) identify, based on the entries in the template representation, target computing resources of the one or more remote networks that can perform the computing function, and (ii) provision the target computing resources onto the one or more remote networks;

receiving, from the IaC server, identification information related to the target computing resources;

obtaining, by the cloud service catalog software application, a second selection of a second particular catalog item, wherein the cloud service catalog software application has access to the second particular catalog item, wherein the second particular catalog item defines second prospective computing resources that provide a second computing function, wherein the second particular catalog item comprises a second plurality of catalog item variables, wherein each catalog item variable of the second plurality of catalog item variables comprises a second plurality of configurations, wherein the second selection includes, for one or more of the second plurality of catalog item variables, a second user-defined configuration of the second plurality of configurations that: (i) associates the second prospective computing resources with the one or more remote networks, and (ii) determines configuration details for the second prospective computing resources;

populating, by the cloud service catalog software application, a second template representation, wherein the second template representation includes entries for the second plurality of catalog item variables;

transmitting, by the cloud service catalog software application to the IaC server, the second template representation, wherein the IaC server is configured to: (i) identify, based on the entries in the second template representation, second target computing resources of the one or more remote networks that can perform the second computing function, and (ii) provision the second target computing resources onto the one or more remote networks; and receiving, from the IaC server, second identification information related to the second target computing resources.

* * * * *